(12) United States Patent
Munsell et al.

(10) Patent No.: US 11,549,387 B2
(45) Date of Patent: Jan. 10, 2023

(54) GAS TURBINE ENGINE FORWARD BEARING COMPARTMENT ARCHITECTURE

(71) Applicant: RAYTHEON TECHNOLOGIES CORPORATION, Farmington, CT (US)

(72) Inventors: Peter M. Munsell, Granby, CT (US); Philip S. Stripinis, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/688,957

(22) Filed: Mar. 8, 2022

(65) Prior Publication Data

US 2022/0341341 A1    Oct. 27, 2022

Related U.S. Application Data

(63) Continuation of application No. 17/164,908, filed on Feb. 2, 2021, now Pat. No. 11,293,299, which is a
(Continued)

(51) Int. Cl.
*F01D 15/12* (2006.01)
*F01D 5/06* (2006.01)
(Continued)

(52) U.S. Cl.
CPC .............. *F01D 15/12* (2013.01); *F01D 5/06* (2013.01); *F01D 9/065* (2013.01); *F01D 25/08* (2013.01);
(Continued)

(58) Field of Classification Search
CPC . F01D 5/06; F01D 9/065; F01D 25/16; F01D 25/18; F01D 25/24; F02C 6/08;
(Continued)

(56) References Cited

U.S. PATENT DOCUMENTS 2,258,792 A    10/1941 New
2,680,001 A    6/1954 Batt
(Continued)

FOREIGN PATENT DOCUMENTS

EP    0791383 A1    8/1997
EP    1142850 A1    10/2001
(Continued)

OTHER PUBLICATIONS

Turner, M. G., Norris, A., and Veres, J.P. (2004). High-fidelity three-dimensional simulation of the GE90. NASA/TM-2004-212981. pp. 1-18.
(Continued)

*Primary Examiner* — Igor Kershteyn
(74) *Attorney, Agent, or Firm* — Carlson, Gaskey & Olds, P.C.

(57) ABSTRACT

A gas turbine engine includes a propulsor section, a compressor section including a first compressor, a front center body case structure that defines a first core flow path for core airflow into the first compressor, an intermediate case structure, a geared architecture, a propulsor shaft, a first bearing structure mounted to the front center body case structure, a bearing compartment passage structure in communication with the first bearing structure through the front center body case structure, and a turbine section.

30 Claims, 5 Drawing Sheets

Related U.S. Application Data continuation of application No. 16/779,768, filed on Feb. 3, 2020, now Pat. No. 10,920,603, which is a continuation of application No. 15/939,508, filed on Mar. 29, 2018, now Pat. No. 10,550,714, which is a continuation of application No. 15/865,393, filed on Jan. 9, 2018, now Pat. No. 10,465,549, which is a continuation of application No. 15/046,524, filed on Feb. 18, 2016, now Pat. No. 9,885,249, which is a continuation of application No. 14/745,724, filed on Jun. 22, 2015, now Pat. No. 9,416,677, which is a continuation-in-part of application No. 14/640,251, filed on Mar. 6, 2015, now Pat. No. 9,410,483, which is a continuation of application No. 13/346,832, filed on Jan. 10, 2012, now Pat. No. 9,004,849.

(51) Int. Cl.
| | |
|---|---|
| *F01D 25/16* | (2006.01) |
| *F01D 25/24* | (2006.01) |
| *F01D 9/06* | (2006.01) |
| *F02C 6/08* | (2006.01) |
| *F01D 25/08* | (2006.01) |
| *F04D 29/32* | (2006.01) |
| *F02C 7/36* | (2006.01) |

(52) U.S. Cl.
CPC ............ *F01D 25/16* (2013.01); *F01D 25/24* (2013.01); *F02C 6/08* (2013.01); *F02C 7/36* (2013.01); *F04D 29/325* (2013.01); *F05D 2220/32* (2013.01); *F05D 2240/50* (2013.01); *F05D 2240/55* (2013.01); *F05D 2260/40311* (2013.01)

(58) Field of Classification Search
CPC ...... F02C 7/36; F04D 29/325; F05D 2220/32; F05D 2240/50; F05D 2240/55; F05D 2260/40311
See application file for complete search history.

(56) References Cited

U.S. PATENT DOCUMENTS

| | | |
|---|---|---|
| 2,756,561 A | 7/1956 | Walton et al. |
| 2,826,895 A | 3/1958 | English |
| 2,936,655 A | 5/1960 | Peterson et al. |
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,382,670 A | 5/1968 | Venable |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark et al. |
| 3,843,277 A | 10/1974 | Ehrich |
| 3,844,110 A | 10/1974 | Widlansky et al. |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 3,990,814 A | 11/1976 | Leone |
| 4,130,872 A | 12/1978 | Haloff |
| 4,220,171 A | 9/1980 | Ruehr et al. |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,645,415 A | 2/1987 | Hovan et al. |
| 4,649,114 A | 3/1987 | Miltenburger et al. |
| 4,696,156 A | 9/1987 | Burr et al. |
| 4,722,357 A | 2/1988 | Wynosky |
| 4,979,362 A | 12/1990 | Vershure, Jr. |
| 4,979,872 A | 12/1990 | Myers et al. |
| 4,991,394 A | 2/1991 | Wright |
| 5,058,617 A | 10/1991 | Stockman et al. |
| 5,080,555 A | 1/1992 | Kempinger |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,623,238 B2 | 9/2003 | Langston et al. |
| 6,709,492 B1 | 3/2004 | Spadaccini et al. |
| 6,814,541 B2 | 11/2004 | Evans et al. |
| 6,883,303 B1 | 4/2005 | Seda |
| 7,021,042 B2 | 4/2006 | Law |
| 7,201,558 B2 | 4/2007 | Norris et al. |
| 7,219,490 B2 | 5/2007 | Dev |
| 7,328,580 B2 | 2/2008 | Lee et al. |
| 7,374,403 B2 | 5/2008 | Decker et al. |
| 7,383,686 B2 | 6/2008 | Aycock et al. |
| 7,591,754 B2 | 9/2009 | Duong et al. |
| 7,632,064 B2 | 12/2009 | Somanath et al. |
| 7,662,059 B2 | 2/2010 | McCune |
| 7,806,651 B2 | 10/2010 | Kennepohl et al. |
| 7,824,305 B2 | 11/2010 | Duong et al. |
| 7,828,682 B2 | 11/2010 | Smook |
| 7,926,260 B2 | 4/2011 | Sheridan et al. |
| 7,950,237 B2 | 5/2011 | Grabowski et al. |
| 7,955,046 B2 | 6/2011 | McCune et al. |
| 7,997,868 B1 | 8/2011 | Liang |
| 8,172,716 B2 | 5/2012 | McCune |
| 8,205,432 B2 * | 6/2012 | Sheridan ................... F02C 7/36 60/226.3 |
| 8,256,707 B2 | 9/2012 | Suciu et al. |
| 8,307,626 B2 | 11/2012 | Sheridan |
| 8,371,127 B2 | 2/2013 | Durocher et al. |
| 8,585,538 B2 | 11/2013 | Sheridan et al. |
| 2006/0228206 A1 | 10/2006 | Decker et al. |
| 2007/0084188 A1 | 4/2007 | Orlando et al. |
| 2007/0193276 A1 | 8/2007 | Corattiyil et al. |
| 2008/0003096 A1 | 1/2008 | Kohli et al. |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0081039 A1 | 3/2009 | McCune et al. |
| 2009/0304518 A1 | 12/2009 | Kodama et al. |
| 2009/0314881 A1 | 12/2009 | Suciu et al. |
| 2010/0105516 A1 * | 4/2010 | Sheridan ................. F16H 1/227 475/346 |
| 2010/0148396 A1 | 6/2010 | Xie et al. |
| 2010/0160105 A1 | 6/2010 | Sheridan et al. |
| 2010/0212281 A1 | 8/2010 | Sheridan |
| 2010/0218483 A1 | 9/2010 | Smith |
| 2010/0331139 A1 | 12/2010 | McCune |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2013/0177385 A1 | 7/2013 | Munsell et al. |
| 2015/0096303 A1 | 4/2015 | Schwarz et al. |

(56) References Cited

U.S. PATENT DOCUMENTS

2017/0362960 A1* 12/2017 Treat ................... F01D 9/041
2019/0249570 A1* 8/2019 Barua ................... B22F 5/009
2021/0310366 A1* 10/2021 Munsell ................ F01D 25/24

FOREIGN PATENT DOCUMENTS

| | | |
|---|---|---|
| EP | 2213864 A2 | 8/2010 |
| EP | 2362081 A1 | 8/2011 |
| GB | 1516041 A | 6/1978 |
| GB | 2041090 A | 9/1980 |
| GB | 2426792 A | 12/2006 |
| WO | 2007038674 A1 | 4/2007 |

OTHER PUBLICATIONS

Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400 30th Aerospace Sciences Meeting & Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Lee, K.N. (2000). Current status of environmental barrier coatings for Si-Based ceramics. Surface and Coatings Technology 133-134, 2000 pp. 1-7.
Levintan, R.M. (1975). Q-Fan demonstrator engine. Journal of Aircraft. vol. 12(8). Aug. 1975. pp. 658-663.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1 187.
Litt, J.S. (2018). Sixth NASA Glenn Research Center propulsion control and diagnostics (PCD) workshop. NASA/CP-2018-219891. Apr. 1, 2018. pp. 1-403.
Lord, W.K., Macmartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
Macisaac, B. and Langston, R. (2011). Gas turbine propulsion systems. Chichester, West Sussex: John Wiley & Sons, Ltd. pp. 260-265.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattlingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-179, 517-520, 563-565, 630-632, 668-670, 673-675, 682-685, 697-705, 726-727, 731-732, 802-805, 828-830 and appendices.
Mattlingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-179, 517-520, 563-565, 630-632, 673-675, 682-685, 697-699, 703-705, 802-805, 862-864, and 923-925.
Mattlingly, J.D. (1996). Elements of gas turbine propulsion. New York, New York: McGraw-Hill, Inc. pp. 8-15.
Mavris, D.N., Schutte, J.S. (2016). Application of deterministic and probabilistic system design methods and enhancements of conceptual design tools for ERA project final report. NASA/CR-2016-219201. May 1, 2016. pp. 1-240.
Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mccracken, R.C. (1979). Quiet short-haul research aircraft familiarization document. NASA-TM-81149. Nov. 1, 1979. pp 1-76.
Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.

(56) References Cited

OTHER PUBLICATIONS

Mcmillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.
Meier N., "Civil Turbojet/Turbofan Specifications", 2005, retrieved from http://jet-engine.net/civtfspec.html, 8 pages.
Merriam-Webster's collegiate dictionary, 10th Ed. (2001). p. 1125-1126.
Merriam-Webster's collegiate dictionary, 11th Ed. (2009). p. 824.
Meyer, A.G. (1988). Transmission development of Textron Lycoming's geared fan engine. Technical Paper. Oct. 1988. pp. 1-12.
Middleton, P. (1971). 614: VFW's jet feederliner. Flight International, Nov. 4, 1971. p. 725, 729-732.
Misel, O.W. (1977). QCSEE main reduction gears test program. NASA CR-134669. Mar. 1, 1977. pp. 1-222.
Moxon, J. How to save fuel in tomorrow's engines. Flight International. Jul. 30, 1983. 3873(124). pp. 272-273.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Munt, R. (1981). Aircraft technology assessment: Progress in low emissions engine. Technical Report. May 1981. pp. 1-171.
Nanocor Technical Data for Epoxy Nanocomposites using Nanomer 1.30E Nanoclay. Nnacor, Inc. Oct. 2004.
NASA Conference Publication. (1978). CTOL transport technology. NASA-CP-2036-PT-1. Jun. 1, 1978. pp. 1-531.
NASA Conference Publication. Quiet, powered-lift propulsion. Cleveland, Ohio. Nov. 14-15, 1978. pp. 1-420.
Neitzel, R., Lee, R., and Chamay, A.J. (1973). Engine and installation preliminary design. Jun. 1, 1973. pp. 1-333.
Neitzel, R.E., Hirschkron, R. and Johnston, R.P. (1976). Study of unconventional aircraft engines designed for low energy consumption NASA-CR-135136. Dec. 1, 1976. pp. 1-153.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Norton, M. and Karczub, D. (2003). Fundamentals of noise and vibration analysis for engineers. Press Syndicate of the University of Cambridge. New York: New York. p. 524.
Oates, G.C. (Ed). (1989). Aircraft propulsion systems and technology and design. Washington, D.C.: American Institute of Aeronautics, Inc. pp. 341-344.
Parametric study of STOL short-haul transport engine cycles and operational techniques to minimize community noise impact. NASA-CR-114759. Jun. 1, 1974. pp. 1-398.
Parker, R.G. and Lin, J. (2001). Modeling, modal properties, and mesh stiffness variation instabilities of planetary gears. Prepared for NASA. NASA/CR-2001-210939. May 2001. pp. 1-111.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge's composite-fan-blade-revolution-turns-20-years-old.
Product Brochure. Garrett TFE731. Allied Signal. Copyright 1987. pp. 1-24.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.

QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
Hess, C. (1998). Pratt & Whitney develops geared turbofan. Flug Revue 43(7). Oct. 1998.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Honeywell LF507. Jane's Aero-engines, Aero-engines—Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines—Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA DR-134868. Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study NASA-CR-174942. May 1985 University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
International Preliminary Report on Patentability for PCT Application No. PCT/US2012/071827, dated Jul. 24, 2014, 10 pages.
International Search Report and Written Opinion for PCT Application No. PCT/US2012/071827, dated Feb. 22, 2013, 10 pages.
Ivchenko-Progress AI-727M. Jane's Aero-engines, Aero-engines-Turbofan. Nov. 27, 2011.

(56) References Cited

OTHER PUBLICATIONS

Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76(1). pp. 3-28.
Jeng, Y.-L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week & Space Technology, 148(8). p. 34-5.
Kandebo, S.W. (1998). Pratt & Whitney launches geared turbofan engine. Aviation Week & Space Technology, 148 (8). p. 32-4.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press, p. 11.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2012). GasTurb 12: Design and off-design performance of gas turbines. Retrieved from: https://www.scribd.com/document/153900429/GasTurb-12.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air 2009, Orlando, Florida. pp. 145-153.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
QCSEE under-the-wing engine composite fan blade preliminary design test report. (1975). NASA-CR-134846. Sep. 1, 1975. pp. 1-56.
QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
Rolls-Royce M45H. Jane's Aero-engines, Aero-engines—Turbofan. Feb. 24, 2010.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France. pp. 1-595.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley & Sons, Inc. pp. 722-726 and 764-771.
Shah, D.M. (1992). MoSi2 and other silicides as high temperature structural materials. Superalloys 1992. The Minerals, Metals, & Materials Society. pp. 409-422.
Shorter Oxford English Dictionary, 6th Edition. (2007), vol. 2, N-Z, p. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

(56) References Cited

OTHER PUBLICATIONS

Singh, A. (2005). Application of a system level model to study the planetary load sharing behavior. Jounal of Mechanical Design. Vol. 127. May 2005. pp. 469-476.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp 1-263.
Smith, C.E., Hirschkron, R., and Warren, R.E. (1981). Propulsion system study for small transport aircraft technology (STAT) Final report. NASA-CR-165330. May 1, 1981. pp. 1-216.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. For Gas Turbine and Power, vol. 123. Oct. 2001. pp 741-746.
Sundaram, S.K., Hsu, J-Y., Speyer, R.F. (1994). Molten glass corrosion resistance of immersed combustion-treating tube materials in soda-lime-silicate glass. J. Am. Ceram. Soc. 77(6). pp. 1613-23.
Sundaram, S.K., Hsu, J-Y., Speyer, R.F. (1995). Molten glass corrosion resistance of immersed combustion-heating tube materials in e-glass. J Am. Ceram. Soc. 78(7). pp. 1940-1946.
Supplementary European Search Report for Application No. EP12865495.1, dated Oct. 29, 2015, 5 pages.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed $MoSi_2$ by the addition of $Sc_2O_3$ and $Y_2O_3$. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
Thulin, R.D., Howe, D.C., and Singer, I.D. (1982). Energy efficient engine: High pressure turbine detailed design report. Prepared for NASA. NASA CR-165608. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines—Turbofan. Nov. 2, 2009.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Dickey, T.A. and Dobak, E.R. (1972). The evolution and development status of ALF 502 turbofan engine. National Aerospace Engineering and Manufacturing Meeting San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press, pp. 215-219 and 855-860.
European Search Report for Application No. EP16174744 dated Nov. 1, 2016, 7 pages.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for United States U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting & Exposition Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (CAT C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of $MoSi_2$-based alloys and composites. Materials Science and Engineering, A155, 1992. pp. 147-158.

(56) References Cited

OTHER PUBLICATIONS

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groeneweg J.F., "Fan noise research at NASA," Inst. of Noise Control Engineering, Noise Con 1994 , pp. 43-52.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited, pp. 510-512.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., et al., "Analysis of turbofan design options for an advanced single-aisle transport aircraft", American Institute of Aeronautics and Astronautics, 2009, pp. 1-13.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor & Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp 1-13.
2003 NASA seal/secondary air system workshop. (2003). NASA/CP-2004-212963/VOL1. Sep. 1, 2004. pp. 1-408.
About GasTurb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
AGMA Standard (1997) Design and selection of components for enclosed gear drives. lexandria, VA: American Gear Manufacturers Association. pp. 1-48.
AGMA Standard (1999) Flexible couplings—Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modem aero engines. ASME. Prestend at the International Gast Turbine & Aeroengine Congress & Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Avco Lycoming Divison. ALF 502L Maintenance Manual. Apr. 1981. pp. 1-118.
Aviadvigatel D-110. Jane's Aero-engines, Aero-engines—Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982. pp. 1-28.
Bloomer, H.E. and Samanich, N.E. (1982). QCSEE under-the-wing enging-wing-flap aerodynamic profile characteristics. NASA-TM-82890. Sep. 1, 1982. pp. 1-48.

(56) References Cited

OTHER PUBLICATIONS

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

Bornstein, N. (1993). Oxidation of advanced intermetallic compounds. Journal de Physique IV, 1993, 03 (C9), pp. C9-367-C9-373.

Brennan, P.J. and Kroliczek, E.J. (1979). Heat pipe design handbook. Prepared for National Aeronautics and Space Administration by B & K Engineering, Inc. Jun. 1979. pp. 1-348.

Brines, G.L. (1990). The turbofan of tomorrow. Mechanical Engineering: The Journal of the American Society of Mechanical Engineers,108(8), 65-67.

Bucknell, R.L. (1973). Influence of fuels and lubricants on turbine engine design and performance, fuel and lubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.

Carney, K., Pereira, M. Revilock, and Matheny, P. (2003). Jet engine fan blade containment using two alternate geometries. 4th European LS-DYNA Users Conference. pp. 1-10.

Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.

Cheryan, M. (1998). Ultrafiltration and microfiltration handbook. Lancaster, PA: Tecnomic Publishing Company, Inc. pp. 171-236.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Clarke, D.R. and Levi, C.G. (2003). Materials design for the next generation thermal barrier coatings. Annual. Rev. Mater. Res. vol. 33. 2003. pp. 383-417.

Cramoisi, G. Ed. (2012). Death in the Potomac: The crash of Air Florida Flight 90. Air Crash Investigations. Accident Report NTSB/AAR-82-8. p. 45-47.

Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.

Daggett, D.L., Brown, S.T., and Kawai, R.T. (2003). Ultra-efficient engine diameter study. NASA/CR-2003-212309. May 2003. pp. 1-52.

Dalton, III., W.N. (2003). Ultra high bypass ratio low noise engine study. NASA/CR-2003-212523. Nov. 2003. pp. 1-187.

Daly, M. Ed. (2008). Jane's Aero-Engine. Issue Twenty-three. Mar. 2008. p. 707-12.

Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan Damerau, Research General Managerat Bosch Corp., Japan. Retrieved from: https://www.researchgate.net/post/What_is_the_mesh_stiffness_of_gears.

Darrah, S. (1987). Jet fuel deoxygenation. Interim Report for Period Mar. 1987-Jul. 1988. pp. 1-22.

Dassault Falcon 900EX Easy Systems Summary. Retrieved from: http://www.smartcockpit.com/docs/F900EX-Engines.pdf pp. 1-31.

Datasheet. CF6-80C2 high-bypass turbofan engines. Retreived from https://geaviation.com/sites/default/files/datasheet-CF6-80C2.pdf.

Datasheet. CFM56-5B For the Airbus A320ceo family and CFM56-7B for the Boeing 737 family. https://www.cfmaeroengines.com/.

Datasheet. Genx™ high bypass turbofan engines. Retreived from: https://www.geaviation.com/sites/default/files/datasheet-genx.pdf.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Davis, D.G.M. (1973). Variable-pitch fans: Progress in Britain. Flight International. Apr. 19, 1973. pp. 615-617.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Declaration of Dr. Magdy Attia, In re U.S. Pat. No. 8,313,280, Executed Oct. 21, 2016, pp. 1-88.

Declaration of Dr. Magdy Attia, In re U.S. Pat. No. 8,517,668, Executed Dec. 8, 2016, pp. 1-81.

Declaration of John Eaton, Ph.D. In re U.S. Pat. No. 8,869,568, Executed Mar. 28, 2016, pp. 1-87.

\* cited by examiner

GAS TURBINE ENGINE FORWARD BEARING COMPARTMENT ARCHITECTURE

RELATED APPLICATIONS

This application is a continuation of U.S. application Ser. No. 17/164,908, filed Feb. 2, 2021, which is a continuation of U.S. application Ser. No. 16/779,768, filed Feb. 3, 2020, which is a continuation of U.S. application Ser. No. 15/939,508, filed Mar. 29, 2018, which is a continuation of Ser. No. 15/865,393, filed Jan. 9, 2018, which is a continuation of U.S. application Ser. No. 15/046,524, filed Feb. 18, 2016, which is a continuation of U.S. application Ser. No. 14/745,724, filed Jun. 22, 2015, which was a continuation-in-part of U.S. patent application Ser. No. 14/640,251, filed Mar. 6, 2015, which was a continuation of prior U.S. patent application Ser. No. 13/346,832, filed Jan. 10, 2012, now U.S. Pat. No. 9,004,849 the entirety of which is herein incorporated by reference.

BACKGROUND

The present disclosure relates to a gas turbine engine, and in particular, to a case structure therefor.

Geared turbofan architectures may utilize epicyclic reduction gearboxes with planetary or star gear trains for their compact design and efficient high gear reduction capabilities. The geared turbofan architecture de-couples a fan rotor from a low spool through the reduction gearbox which results in isolation of the forwardmost bearing compartment.

SUMMARY

In a featured embodiment, a gas turbine engine includes a front center body case structure. A geared architecture is at least partially supported by the front center body case structure. A bearing structure is mounted to the front center body case structure to rotationally support a shaft driven by the geared architecture. The shaft drives a fan. A bearing compartment passage structure is in communication with the bearing structure through the front center body case structure.

In another embodiment according to the previous embodiment, the bearing structure includes a seal.

In another embodiment according to any of the previous embodiments, the bearing structure includes a bearing.

In another embodiment according to any of the previous embodiments, the bearing compartment passage structure includes a hollow front center body strut.

In another embodiment according to any of the previous embodiments, the hollow front center body strut is in fluid communication with a fan rotor bearing support structure which at least partially supports the bearing structure.

In another embodiment according to any of the previous embodiments, further includes a conditioning device in communication with the bearing compartment passage structure.

In another embodiment according to any of the previous embodiments, the conditioning device is a heat exchanger.

In another embodiment according to any of the previous embodiments, the conditioning device is in communication with a high pressure compressor.

In another embodiment according to any of the previous embodiments, the high pressure compressor is axially downstream of the geared architecture.

In another embodiment according to any of the previous embodiments, the conditioning device is radially outboard of a low pressure compressor.

In another embodiment according to any of the previous embodiments, the low pressure compressor is downstream of the geared architecture.

In another embodiment according to any of the previous embodiments, the bearing structure is axially between the fan and the geared architecture.

In another embodiment according to any of the previous embodiments, the front center body case structure defines a core flow path for a core airflow.

In another embodiment according to any of the previous embodiments, there are three turbine rotors, with a most downstream of the three turbine rotors driving the geared architecture.

In another featured embodiment, the method of communicating a buffer supply air for a gas turbine engine includes communicating a buffer supply air across a core flow path, and communicating the buffer supply air through a hollow front center body strut of a front center body case structure which defines the core flow path, the hollow front center body strut within the core flow path.

In another embodiment according to the previous embodiment, further including communicating the buffer supply air to a bearing compartment forward of a geared architecture.

In another embodiment according to the previous embodiment, further including, communicating the buffer supply air through a conditioning device upstream of the hollow front center body strut.

In another embodiment according to the previous embodiment, further including, communicating the buffer supply air to a bearing structure mounted to a front center body case structure which defines the core flow path. The bearing structure rotationally supports a shaft driven by a geared architecture.

In another embodiment according to the previous embodiment, further including, driving a fan through the geared architecture. The bearing structure is axially located between the fan and the geared architecture.

In another featured embodiment, a method of communicating a buffer supply air for a gas turbine engine includes communicating a buffer supply air across a core flow path, communicating the buffer supply air to a bearing structure mounted to a front center body case structure which defines the core flow path, the bearing structure rotationally supporting a shaft driven by a geared architecture, driving a fan through the geared architecture, the bearing structure axially located between the fan and the geared architecture, and communicating the buffer supply air to a spinner supported by the fan.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
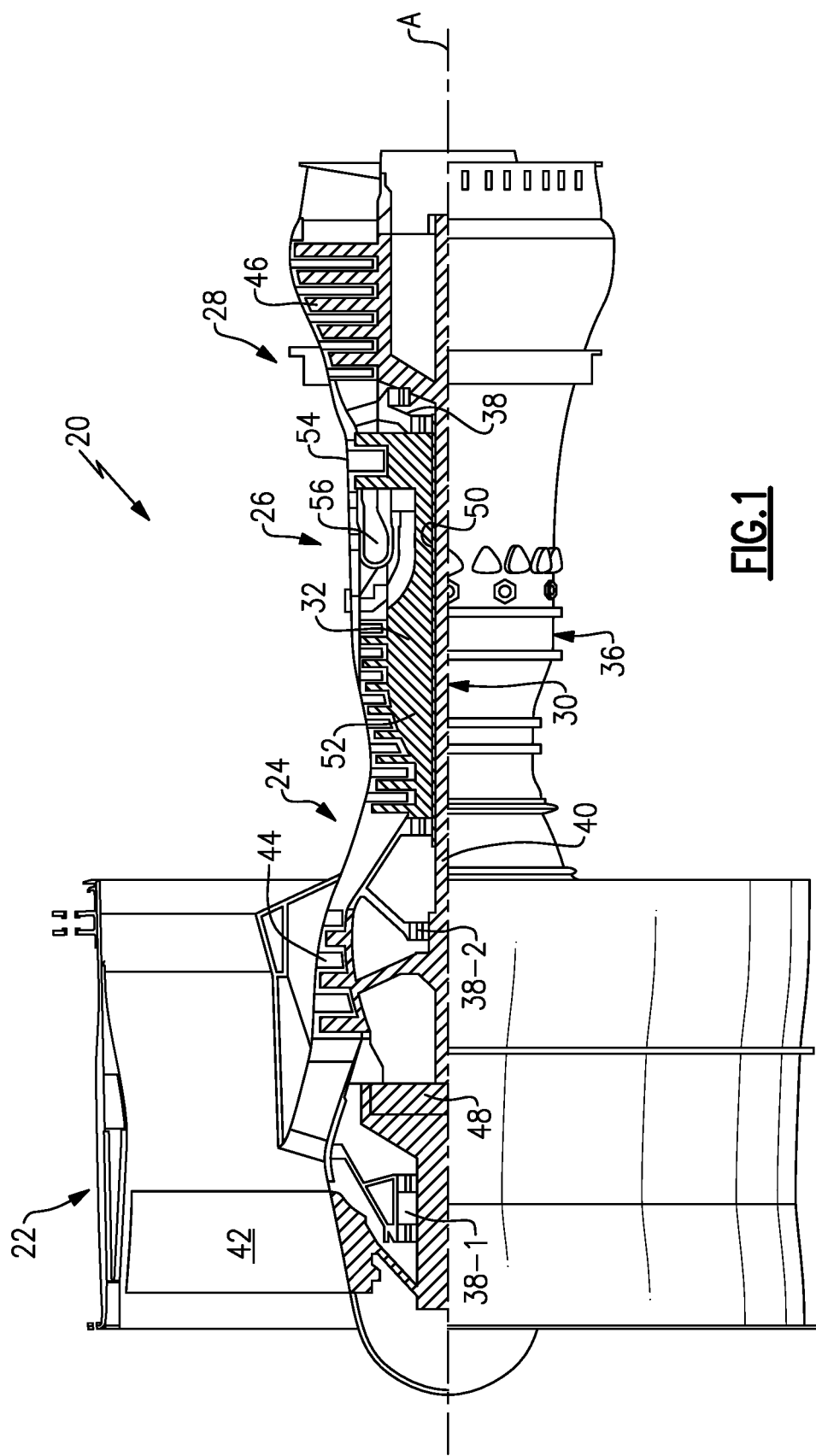
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The engine shafts 40, 50 are supported at a plurality of points by bearing structures 38 within the engine static structure 36. In one non-limiting embodiment, bearing structures 38 includes a #1 bearing structure 38-1 forward of the gearbox 72 and a #2 bearing structure 38-2 located aft of the gearbox 72.

Figure 2:
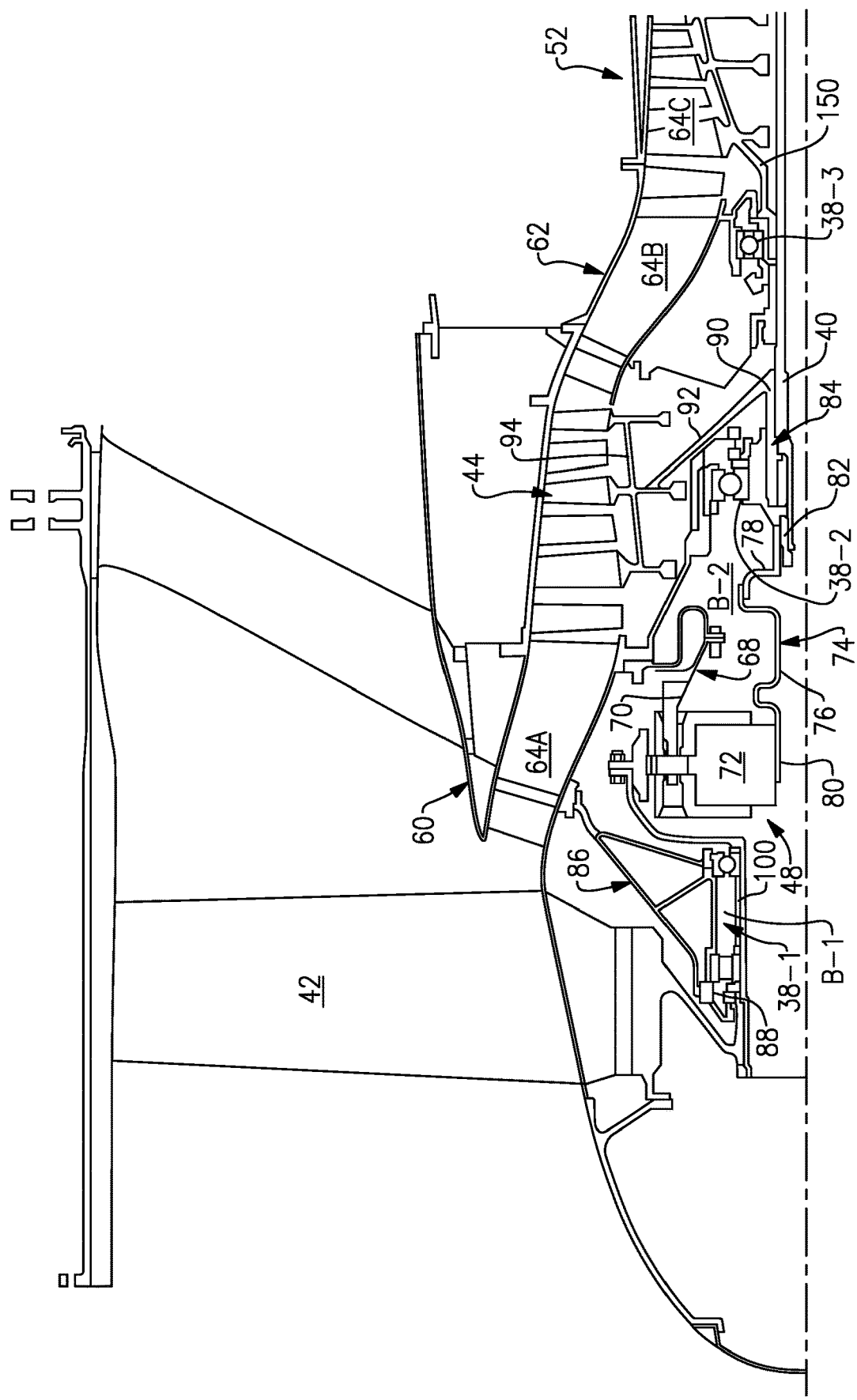
FIG. 2 is an enlarged schematic cross-section of a sectional of the gas turbine engine.

With reference to FIG. 2, the engine static structure 36 proximate the compressor section 24 generally includes a front center body case structure 60 and an intermediate case structure 62 which mounts aft of the front center body case structure 60. It should be appreciated that various case structures may alternatively or additionally be provided, yet benefit from the architecture described herein.

The front center body case structure 60 generally defines an annular core flow path 64A for the core airflow into the low pressure compressor 44. The intermediate case structure 62 defines the core flow path 64B aft of the core flow path 64A into the high pressure compressor 52 core flow path 64C. The core flow path 64B is generally radially inward of the core flow path 64A to transition into the radially smaller diameter core flow path 64C. That is, the core flow path 64B generally defines a "wasp waist" gas turbine engine architecture.

The #2 bearing structure 38-2 at least partially supports the inner shaft 40 relative to the front center body case structure 60. A #3 bearing structure 38-3 generally supports the outer shaft 50 relative the intermediate case structure 62. That is, the #2 bearing structure 38-2 at least partially supports the low spool 30 and the #3 bearing structure 38-3 at least partially supports the high spool 32. It should be appreciated that various bearing systems such as thrust bearing structures and mount arrangements will benefit herefrom.

A flex support 68 provides a flexible attachment of the geared architecture 48 within the front center body case structure 60. The flex support 68 reacts the torsional loads from the geared architecture 48 and facilitates vibration absorption as well as other support functions. A centering spring 70, which is a generally cylindrical cage-like structural component with a multiple of beams that extend between flange end structures, resiliently positions the #2 bearing structure 38-2 with respect to the low spool 30. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

The gearbox 72 of the geared architecture 48 is driven by the low spool 30 in the disclosed non-limiting embodiment through a coupling shaft 74. The coupling shaft 74 transfers torque through the #2 bearing structure 38-2 to the gearbox 72 as well as facilitates the segregation of vibrations and other transients. The coupling shaft 74 in the disclosed non-limiting embodiment includes a forward coupling shaft section 76 and an aft coupling shaft section 78. The forward coupling shaft section 76 includes an interface spline 80 which mates with the gearbox 72. An interface spline 82 of the aft coupling shaft section 78 connects the coupling shaft 74 to the low spool 30 through, in this non limiting embodiment, a low pressure compressor hub 84 of the low pressure compressor 44.

A fan rotor bearing support structure 86 aft of the fan 42 extends radially inward from the front center body case structure 60. The fan rotor bearing support structure 86 and the front center body case structure 60 define a bearing compartment B-2. It should be appreciated that various bearing structures 38 and seals 88 may be supported by the fan rotor bearing support structure 86 to contain oil and support rotation of an output shaft 100 which connects with the geared architecture 48 to drive the fan 42.

The low pressure compressor hub 84 of the low pressure compressor 44 includes a tubular hub 90 and a frustro-conical web 92. The tubular hub 90 mounts to the inner shaft 40 through, for example, a splined interface adjacent to the #2 bearing structure 38-2. The frustro-conical web 92 extends in a forwardly direction from the tubular hub 90 axially between the #2 bearing structure 38-2 and the #3 bearing structure 38-3. That is, the frustro-conical web 92 is axially located between the bearing structures 38-2, 38-3.

Figure 3:
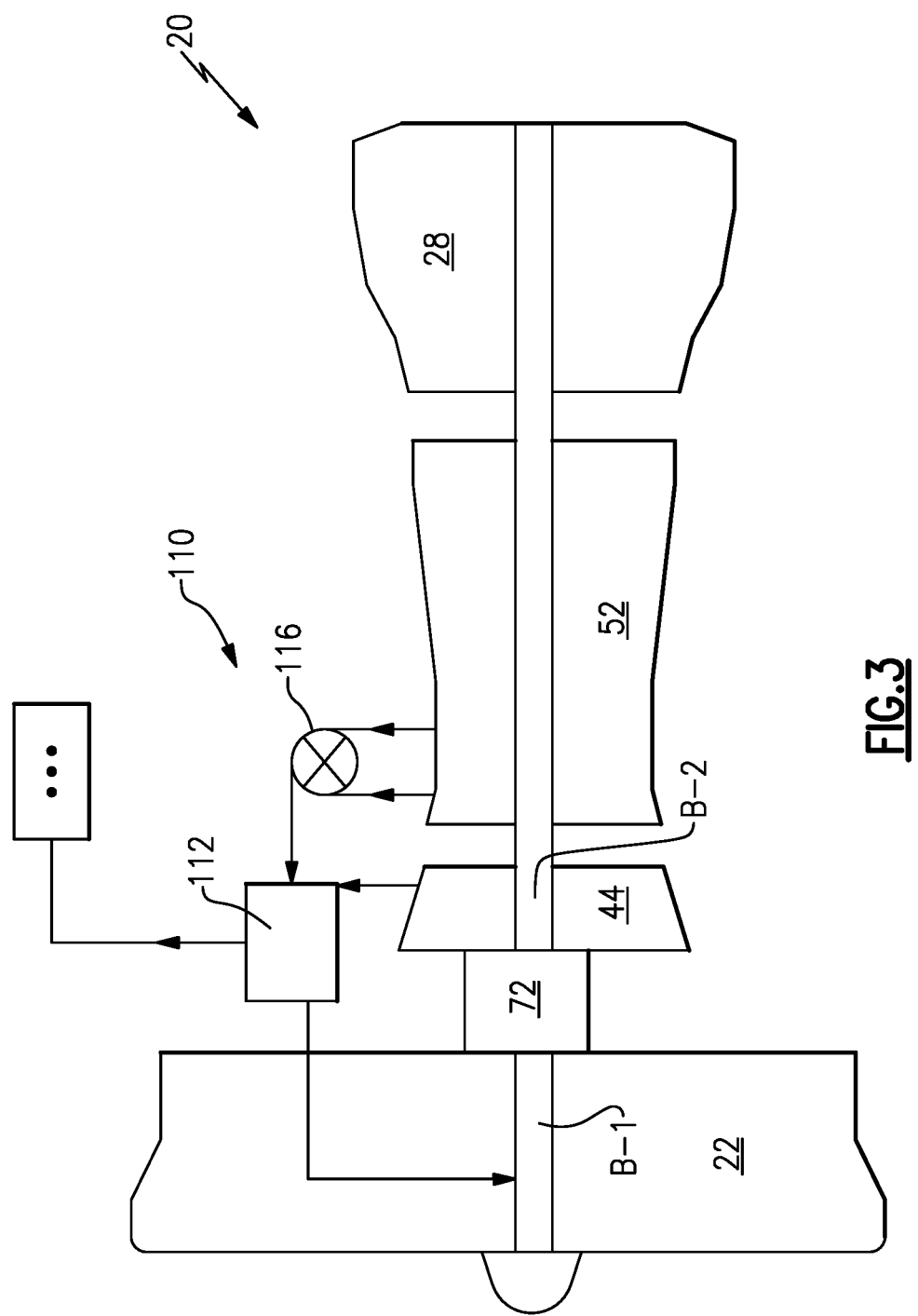
FIG. 3 is a schematic view of a gas turbine engine with a bearing compartment passage structure which bypasses around a geared architecture.

The #1 bearing structure 38-1 supports the output shaft 100 which connects the geared architecture 48 to the fan 42. The #1 bearing structure 38-1 is located within a bearing compartment B-1 that is isolated by the geared architecture 48 from bearing compartment B-2. That is, the #1 bearing compartment B-1 is isolated from the engine core aft of the geared architecture 48 and receives its buffer pressurization supply of buffer supply air through a #1 bearing compartment passage structure 110 that crosses the annular core flow path 64A for the core airflow into the low pressure compressor 44 (FIG. 3).

Figure 4:
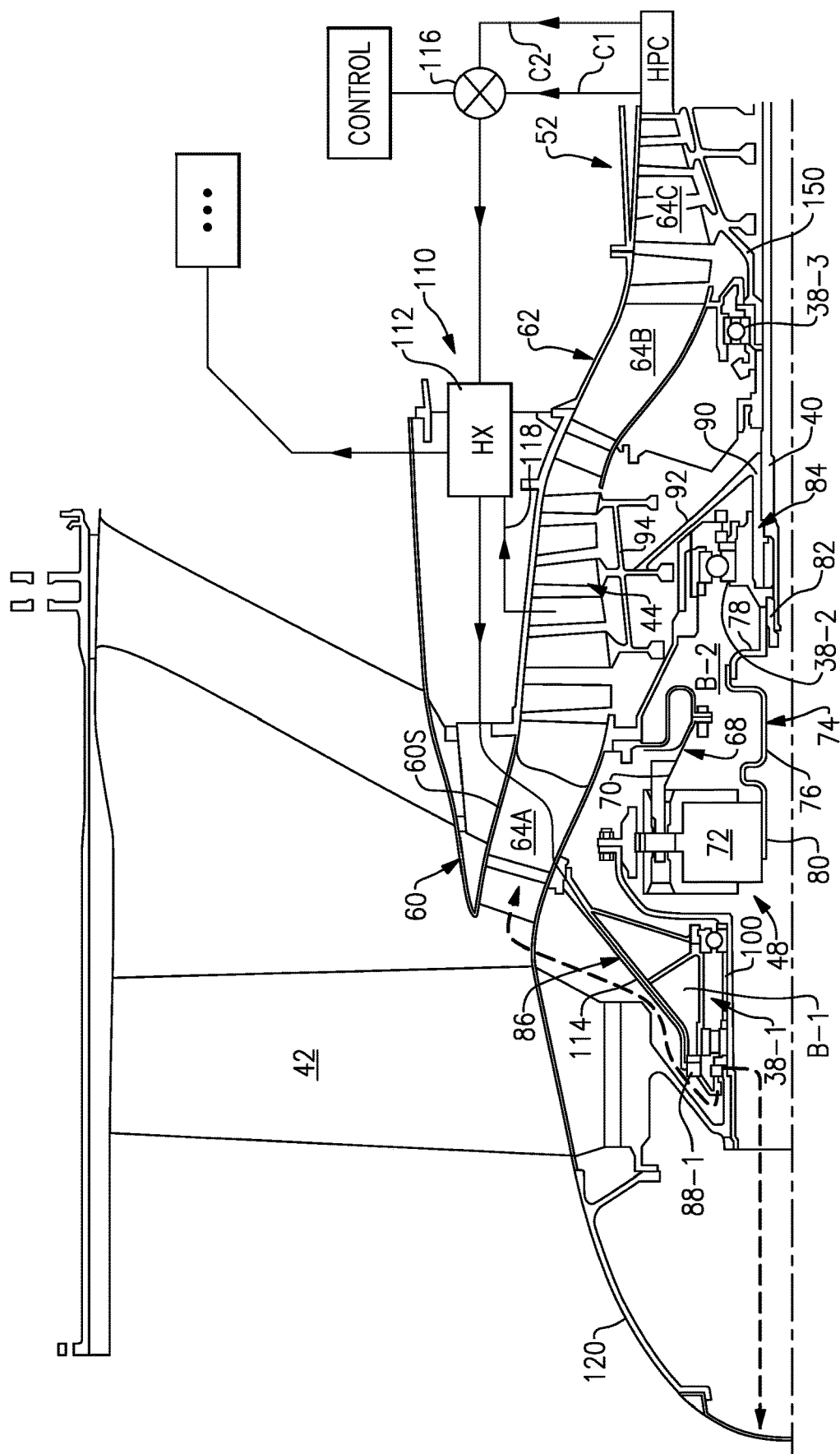
FIG. 4 is an enlarged schematic cross-section of a sectional of the gas turbine engine, which illustrates the bearing compartment passage structure.

With reference to FIG. 4, the #1 bearing compartment passage structure 110 is in communication with the core engine such as with the high pressure compressor 52 to supply a higher pressure bleed air flow of buffer supply air into the #1 bearing compartment B-1 such as the seal 88-1 to, for example, pressurize the seal 88-1 and seal lubricating fluid with respect to the #1 bearing structure 38-1. The buffer supply air may be communicated from various other sources and may pass through, for example, a conditioning device 112 such as a buffer heat exchanger. The conditioning device 112 may further condition bleed flow C1, C2 from the high pressure compressor. It should be appreciated the various bleed sources from the high pressure compressor 52 may be selected through a valve 116.

The #1 bearing compartment passage structure 110 may be at least partially defined by a hollow front center body strut 60S of the front center body case structure 60 to permit the buffer supply air to cross the annular core flow path 64A without flow interference. That is, the buffer supply air is communicated through the hollow front center body strut 60S and the core airflow passes around the hollow front center body strut 60S.

From the hollow front center body strut 60S, the buffer supply air is communicated through a passage 114 in the fan rotor bearing support structure 86 to, for example, the seal 88-1. It should be appreciated that various passages may alternatively or additionally be provided.

The passage of buffer supply air through the fan rotor bearing support structure 86 advantageously promotes heat transfer between the buffer supply air and the #1 bearing compartment B-1 to reduce buffer supply air maximum temperate at high power condition and increases buffer supply air minimum temperatures at lower power settings. As the #1 bearing structure 38-1 operates at a generally constant temperature, the #1 bearing compartment B-1 operates as a thermal ground with respect to the buffer supply air.

Downstream of the #1 bearing compartment B-1, the buffer supply air may be communicated in various manners for various usages such as toward the spinner 120 to facilitate spinner de-icing. The buffer supply air may alternatively or additionally be ejected outward aft of the fan 42 to recirculate into the annular core flow path 64A to minimize any effect upon engine efficiency.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Figure 5:
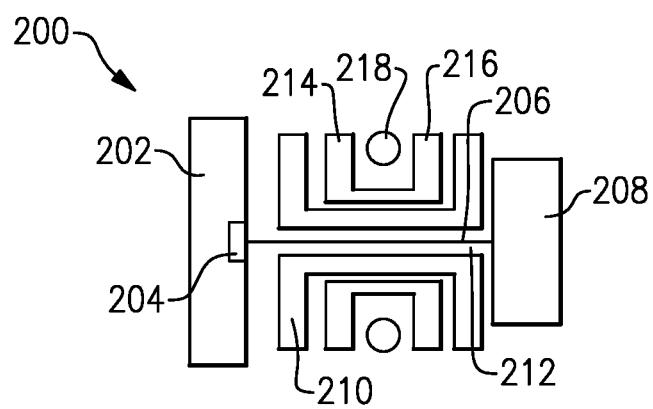
FIG. 5 shows another embodiment.

FIG. 5 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 6:
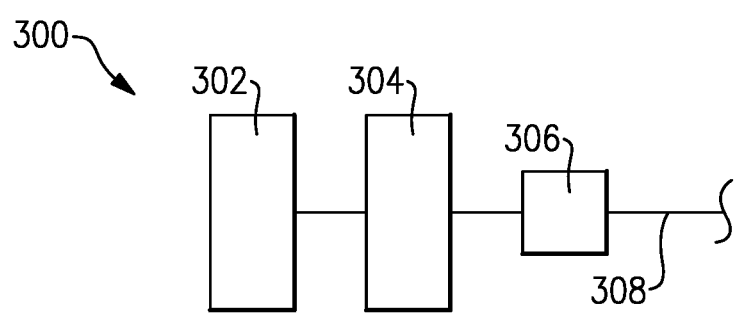
FIG. 6 shows yet another embodiment.

FIG. 6 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A gas turbine engine comprising:
   a propulsor section including a propulsor;
   a compressor section including a first compressor and a second compressor axially aft of the first compressor relative to an engine longitudinal axis;
   a front center body case structure that defines a first core flow path for core airflow into the first compressor, the front center body case structure including a forward end and an aft end;
   an intermediate case structure that defines a second core flow path for core airflow into the second compressor, the intermediate case structure mounted to the aft end of front center body case structure;
   a geared architecture at least partially supported by the front center body case structure;
   a propulsor shaft that connects with the geared architecture to drive the propulsor;
   a first bearing structure forward of the geared architecture relative to the engine longitudinal axis, the first bearing structure mounted to the front center body case structure, and the first bearing structure including a first bearing located within a first bearing compartment that rotationally supports the propulsor shaft;
   a bearing compartment passage structure in communication with the first bearing structure through the front center body case structure; and
   a turbine section including a first turbine that drives the second compressor and a second turbine that drives the geared architecture to drive the propulsor at a speed lower than a speed of the second turbine.

2. The gas turbine engine as recited in claim 1, wherein the front center body case structure includes a hollow front center body strut within the first core flow path, and the bearing compartment passage structure is at least partially defined by the hollow front center body strut such that the bearing compartment passage structure crosses the first core flow path.

3. The gas turbine engine as recited in claim 2, wherein the geared architecture is an epicyclic transmission.

4. The gas turbine engine as recited in claim 3, wherein both the first compressor and the second turbine include a greater number of stages than the first turbine.

5. The gas turbine engine as recited in claim 4, wherein the bearing compartment passage structure crosses the first core flow path at a position axially forward of the first compressor relative to the engine longitudinal axis.

6. The gas turbine engine as recited in claim 5, further comprising:
a rotor bearing support structure extending radially inward from the front center body case structure to at least partially support the first bearing structure; and
wherein the hollow front center body strut fluidly communicates with a passage of the rotor bearing support structure.

7. The gas turbine engine as recited in claim 6, wherein the first bearing structure is axially between the propulsor and the geared architecture with respect to the engine longitudinal axis.

8. The gas turbine engine as recited in claim 7, wherein the first bearing compartment receives buffer supply air through the bearing compartment passage structure in operation.

9. The gas turbine engine as recited in claim 8, wherein the first bearing structure operates as a thermal ground with respect to buffer supply air communicated from the rotor bearing support structure.

10. The gas turbine engine as recited in claim 7, wherein the first bearing structure includes a seal, and the passage of the rotor bearing support structure is arranged to supply air to pressurize the seal.

11. The gas turbine engine as recited in claim 10, further comprising:
a conditioning device in communication with the bearing compartment passage structure and that conditions a first bleed flow from the second compressor.

12. The gas turbine engine as recited in claim 11, wherein the conditioning device conditions a second, different bleed flow from the second compressor, and the first bleed flow and the second bleed flow are selectable through a valve.

13. The gas turbine engine as recited in claim 7, further comprising:
a second bearing compartment axially aft of the geared architecture with respect to the engine longitudinal axis, the first bearing compartment isolated by the geared architecture from the second bearing compartment.

14. The gas turbine engine as recited in claim 13, further comprising:
a second bearing structure within the second bearing compartment, the second bearing structure at least partially supporting a first shaft, the first shaft interconnecting the second turbine and an input of the geared architecture.

15. The gas turbine engine as recited in claim 7, further comprising:
a first spool including a first shaft interconnecting the geared architecture and the second turbine; and
a second spool including a second shaft interconnecting the second compressor and the first turbine, wherein the first shaft and the second shaft are concentric and rotate about the engine longitudinal axis.

16. The gas turbine engine as recited in claim 15, further comprising a flex support that provides a flexible attachment of the geared architecture with respect to the front center body case structure.

17. The gas turbine engine as recited in claim 16, wherein the flex support reacts torsional loads from the geared architecture and facilitates vibration absorption in operation.

18. The gas turbine engine as recited in claim 17, further comprising:
a second bearing compartment axially aft of the geared architecture with respect to the engine longitudinal axis, the first bearing compartment isolated by the geared architecture from the second bearing compartment; and
a second bearing structure within the second bearing compartment, the second bearing structure at least partially supporting the first shaft relative to the front center body case structure.

19. The gas turbine engine as recited in claim 18, further comprising:
a coupling shaft interconnecting an input of the geared architecture and the first shaft; and
wherein the coupling shaft transfers torque through the second bearing structure to the geared architecture in operation, and the coupling shaft facilitates segregation of vibrations in operation.

20. The gas turbine engine as recited in claim 19, further comprising:
a centering spring that resiliently positions the second bearing structure with respect to the first spool.

21. The gas turbine engine as recited in claim 17, wherein the geared architecture is a planetary gear system.

22. The gas turbine engine as recited in claim 21, wherein the propulsor is a fan, and further comprising an outer housing surrounding the fan to define a bypass duct.

23. The gas turbine engine as recited in claim 21, further comprising:
a second bearing compartment axially aft of the geared architecture with respect to the engine longitudinal axis, the first bearing compartment isolated by the geared architecture from the second bearing compartment; and
a second bearing structure within the second bearing compartment, the second bearing structure at least partially supporting the first shaft relative to the front center body case structure;
a third bearing structure at least partially supporting the second shaft relative to the intermediate case structure;
wherein the bearing compartment passage structure communicates with the second compressor to supply the buffer supply air into the first bearing compartment; and
wherein the first compressor includes a compressor hub, the compressor hub includes a tubular hub and a frustro-conical web, the tubular hub is mounted to the first shaft, and the frustro-conical web extends from the tubular hub such that the frustro-conical web is axially between the second bearing structure and the third bearing structure relative to the engine longitudinal axis.

24. A method of communicating a buffer supply air for a gas turbine engine comprising:
communicating a buffer supply air across a core flow path, the core flow path defined by a front center body case structure;
communicating the buffer supply air through a hollow strut of the front center body case structure to a first bearing structure, the hollow strut within the core flow path at a position upstream of a first compressor, the first bearing structure mounted to the front center body case structure, the first bearing structure rotationally supporting a propulsor shaft coupled to a propulsor, the first bearing structure forward of a geared architecture relative to an engine longitudinal axis, the geared architecture at least partially supported by the front center body case structure, and the first bearing structure including a first bearing located within a first bearing compartment rotationally supporting the propulsor shaft;

driving the propulsor shaft through the geared architecture; and driving the geared architecture by a second turbine such that the geared architecture drives the propulsor at a speed lower than a speed of the second turbine.

25. The method as recited in claim 24, further comprising:

supplying the buffer supply air from the hollow strut to a passage of a rotor bearing support structure to pressurize a seal of the first bearing structure, wherein the rotor bearing support structure at least partially supports the first bearing structure.

26. The method as recited in claim 25, further comprising:

communicating the buffer supply air from a second compressor to the hollow strut, the second compressor downstream of the first compressor relative to a direction of flow through the core flow path; and wherein the first compressor includes three stages.

27. The method as recited in claim 26, wherein the first bearing structure operates as a thermal ground with respect to the buffer supply air communicated from the rotor bearing support structure.

28. The method as recited in claim 26, further comprising:

selecting a first bleed flow and a second, different bleed flow from the second compressor through a valve; and conditioning with a conditioning device the selected one of the first and second bleed flows to provide the buffer supply air, wherein the conditioning device is a heat exchanger.

29. The method as recited in claim 28, further comprising:

ejecting the buffer supply air from the first bearing structure at a position aft of the propulsor to recirculate the buffer supply air into the core flow path.

30. The method as recited in claim 28, further comprising:

supporting a turbine shaft by a second bearing structure, the second bearing structure including a second bearing compartment axially aft of the geared architecture with respect to the engine longitudinal axis, the second bearing structure including a second bearing located within a second bearing compartment that rotationally supports the turbine shaft, and the first bearing compartment isolated by the geared architecture from the second bearing compartment; and driving the turbine shaft by the second turbine to drive an input of the geared architecture.

* * * * *